(12) United States Patent
McKedy

(10) Patent No.: US 7,594,957 B2
(45) Date of Patent: Sep. 29, 2009

(54) METHOD OF ABSORBING OXYGEN

(75) Inventor: George E. McKedy, Williamsville, NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 439 days.

(21) Appl. No.: 11/531,292

(22) Filed: Sep. 13, 2006

(65) Prior Publication Data

US 2007/0007490 A1    Jan. 11, 2007

Related U.S. Application Data

(62) Division of application No. 10/772,197, filed on Feb. 4, 2004, now Pat. No. 7,125,498.

(51) Int. Cl.
*B01J 20/02* (2006.01)

(52) U.S. Cl. .......................... 95/138; 95/900

(58) Field of Classification Search .............. 95/138, 95/117, 900; 96/108; 252/188.28, 397, 399, 252/400.1, 400.53; 206/204; 423/219; 502/406
See application file for complete search history.

(56) References Cited

U.S. PATENT DOCUMENTS

| 4,265,675 A | * | 5/1981 | Tsao et al. ............... 127/37 |
| 4,421,533 A | * | 12/1983 | Nishino et al. ........... 95/138 |
| 4,588,561 A | * | 5/1986 | Aswell et al. ............ 422/238 |
| 4,652,435 A | * | 3/1987 | Natsuume et al. ........ 423/265 |
| 4,705,876 A | * | 11/1987 | Ivanov et al. ............ 556/149 |
| 5,750,037 A | * | 5/1998 | Bizot et al. .............. 210/750 |
| 5,928,560 A | * | 7/1999 | DelDuca et al. ......... 252/188.28 |
| 6,209,289 B1 | | 4/2001 | Cullen et al. |
| 6,306,201 B1 | * | 10/2001 | Makino ................. 106/14.13 |
| 6,558,571 B1 | * | 5/2003 | Powers ................. 252/188.28 |
| 6,616,861 B1 | * | 9/2003 | Evans et al. ........... 252/188.28 |
| 6,667,273 B1 | * | 12/2003 | Cullen et al. ............ 502/406 |

FOREIGN PATENT DOCUMENTS

JP    63-277058 A  * 11/1988
WO   01/25369 A1   4/2001

OTHER PUBLICATIONS

Internet Document "Potassium tartrate", Chemfinder.com, CambridgeSoft Corporation, 2004.*
EPO Examining Divison, First Communication for EP 05712591.6 dated Sep. 6, 2009, 3 pages.
Australian Government/IP Australia, Examiner's Report for patent application 2005212269, dated Jul. 1, 2009; 3 pages.

* cited by examiner

*Primary Examiner*—Frank M Lawrence
(74) *Attorney, Agent, or Firm*—Stephen B. Salai, Esq.; Brian B. Shaw, Esq.; Harter Secrest & Emery LLP

(57) ABSTRACT

An oxygen-absorbing composition including iron and a soluble tartrate. A method of absorbing oxygen from a closed environment including the steps of providing an oxygen-absorbing composition containing iron and a tartrate, injecting water into the composition, and placing the composition into the closed environment. An oxygen-absorbing packet containing iron and a tartrate. All of the foregoing-mentioned compositions preferably include an electrolyte. The tartrates may be selected from the group which may include solium acid tartrate, potassium acid tartrate, potassium sodium tartrate tetrahydrate and sodium tartrate dihydrate, but are not limited thereto.

18 Claims, No Drawings

METHOD OF ABSORBING OXYGEN

CROSS-REFERENCE TO RELATED APPLICATIONS

This Application is a Divisional of U.S. Ser. No. 10/772,197 filed Feb. 4, 2004, now U.S. Pat. No. 7,125,498.

STATEMENT REGARDING FEDERALLY SPONSORED RESEARCH OR DEVELOPMENT

Not Applicable

BACKGROUND OF THE INVENTION

The present invention relates to improved oxygen-absorbing compositions and to a method for absorbing oxygen rapidly from a closed container without generating hydrogen.

In certain applications where oxygen has to be absorbed rapidly from a closed container, the oxygen-absorbing composition is provided with an acidic environment, either by injecting an acid or injecting water to activate a dry acid in the composition.

One example of the foregoing is described in U.S. Pat. No. 5,928,560 which discloses a packet of an oxygen-absorbing composition which is rapidly activated by the injection of an acid, such as acetic acid, or the injection of water where a dry acid is present. The prior art composition which is injected with an acid includes iron, an electrolyte salt, such as sodium chloride, and a carbonate which releases carbon dioxide. The prior art composition which contains the foregoing components and an acid salt is injected with water. The injected packet is inserted into a flexible package containing an oxygen-sensitive product. However, the foregoing oxygen-absorbing compositions had a serious drawback because incidental to the oxygen-absorption, hydrogen gas was generated which could bloat the flexible package containing the oxygen-sensitive product.

Another example of a prior oxygen-absorbing composition is disclosed in U.S. Pat. No. 6,538,571 wherein the foregoing problem of hydrogen gas generation was overcome by including an inhibited carbon dioxide generating compound so that it created a less acidic environment after rapid oxygen absorption, and this less acidic environment reduced the concentration of hydronium ions in solution to thereby inhibit the generation of hydrogen gas to insignificant levels.

BRIEF SUMMARY OF THE INVENTION

It is one object of the present invention to provide an improved oxygen-absorbing composition which rapidly absorbs oxygen environment without generating hydrogen.

It is another object of the present invention to provide an improved method of rapidly absorbing oxygen environment of a closed container without generating hydrogen.

It is a further object of the present invention to provide an oxygen-absorbing composition which contains a lesser number of components than other compositions which are used for a like purpose. Other objects and attendant advantages of the present invention will readily be perceived hereafter.

The present invention relates to an oxygen-absorbing composition consisting essentially of iron and a tartrate.

The present invention also relates to an oxygen-absorbing composition as set forth in the immediately preceding paragraph which also includes a water-absorbing agent.

The present invention also relates to a method of absorbing oxygen from a closed environment comprising the steps of providing an oxygen-absorbing composition consisting essentially of iron and a tartrate, and injecting water into said composition.

The present invention also relates to the method of the immediately preceding paragraph wherein the composition also includes a water-absorbing agent.

The present invention also relates to a method of absorbing oxygen from a closed environment comprising the steps of providing an oxygen-absorbing composition comprising iron and a tartrate, and injecting water into said composition.

The present invention also relates to the method of the immediately preceding paragraph wherein said composition also includes a water-absorbing agent.

All of the above compositions preferably include an electrolyte.

The various aspects of the present invention will be more fully understood from a reading of the following portions of the specification.

DETAILED DESCRIPTION OF THE INVENTION

The composition and method of the present invention effect rapid absorption of oxygen from a closed container having an oxygen-sensitive product, such as meat, fish or other edible or non-edible material, without generating hydrogen.

In accordance with the present invention, an oxygen-permeable packet containing the oxygen-absorbing composition of the present invention is placed in a package or container along with the oxygen-sensitive product which is to be protected from oxygen deterioration. The packet of oxygen-absorbing composition is activated by the injection of water, and the packet is then placed into the package containing the oxygen-sensitive product. The oxygen-permeable material of the oxygen-absorbing packet will retain the oxygen-absorbing composition and injected water during the oxygen-absorption process wherein oxygen is rapidly absorbed from the closed package or container through the permeable packet without generating hydrogen. The oxygen-absorbing packet may be fabricated from (1) spunbonded polyethylene (2) microperforated materials and structures (3) oxygen-permeable materials, such as acrylics, acetates and styrenes (4) porous materials, such as plain and treated papers and woven and non-woven fabrics, or any other suitable material.

The heart of the present invention is the use of a composition containing iron and a tartrate. The tartrate can be selected from the group which may include potassium acid tartrate, sodium acid tartrate, potassium sodium tartrate tetrahydrate and sodium tartrate dihydrate, but is not limited thereto. The composition preferably also contains an electrolyte salt such as sodium chloride. When water is injected into the foregoing composition, it produces an environment which enhances rapid oxygen-absorption without the generation of hydrogen gas. It is believed that the hydrogen is not generated because there are no hydronium ions present. Oxygen-absorption continues as oxygen is rapidly drawn from a container into the permeable packet containing the oxygen-absorbing composition. There is no hydrogen generated within the permeable packet which otherwise could then pass out through the permeable packet and remain present in a rigid container or effect bloating of a flexible container which contains the oxygen-sensitive product which is to be protected from oxygen deterioration.

In the foregoing type of reaction, the oxygen-absorbing composition absorbs all of the oxygen from the closed container containing the oxygen-sensitive product. When the oxygen-absorbing composition has more than a sufficient capacity to absorb all of the available oxygen, it then seeks to reduce any other reducible element or compound that is present. However, since there have been no hydronium ions produced, they cannot be reduced to produce hydrogen gas after all of the oxygen has been absorbed.

As noted briefly above, the oxygen-absorbing composition of the present invention may comprise in relatively sufficient proportions iron, an electrolyte salt and a tartrate. It can also include a water-absorbing agent and a wicking agent. Also, as noted above, the composition can include only iron and the tartrate, and such composition can be activated by the injection of water because the tartrate also acts as an electrolyte salt. However, it does not absorb oxygen as rapidly as when an electrolyte is present.

The iron of the composition may be any type of iron including sponge grade iron, electrolytically reduced iron, hydrogen reduced iron, carbonyl iron or any other suitable iron or other oxidizable metal, such as zinc, copper and tin, and preferably annealed electrolytically reduced iron. The iron can be present by weight in an amount of between 50% and 98%, and more preferably about 70% and 90% and most preferably between about 75% and 85%. The iron is preferably in granular form and can be of a U.S. mesh size of between 40 and 500 and more preferably between about 50 and 400 and most preferably between about 100 and 325.

The salt which produces an electrolyte may be any alkali metal or transition metal halide or any other salt capable of functioning as an electrolyte and preferably can be sodium chloride. The salt can be present by weight in an amount of between about 0.10% to 1%, and more preferably between about 1% and 5%, and most preferably between 2% and 3%. However, it will be appreciated that under certain circumstances an electrolyte salt may not be needed when the tartrate acts as an electrolyte.

In accordance with the present invention, the tartrate of the composition may be present by weight in an amount of between about 3% and 50%, and more preferably about 8% and 30% and most preferably between about 10% and 20%.

In addition, the composition may include a water-absorbing agent such as silica gel in the amount of between about 1% and 50%, and more preferably about 3% and 30% and most preferably between about 5% and 15%. Other water-absorbing agents, such as molecular sieve, zeolite, carbon and clay may be used in the same proportions. The water-absorbing agent functions to disperse water throughout the reaction mixture to enhance the rate and completeness of the reaction.

In addition, a wicking agent may be used to rapidly distribute the injected water through the composition for efficient oxygen-absorption. Such a wicking agent may be powdered cellulose which may be present by weight in an amount of between about 0.5% and 30%, and more preferably about 5% and 25% and most preferably between about 8% and 18%. The powdered cellulose is preferably of a particle size of between about 20 and 100 microns, but any suitable powdered cellulose may be used. A powdered cellulose wicking agent which has been used is known under the trademark SOLKA-FLOC. Additionally, other wicking agents which may be used may include without limitation soluble fiber, starches and vegetable gums.

The above described product is preferably packaged in an oxygen-permeable TYVEK packet of the general types shown in U.S. Pat. Nos. 4,992,410 and 3,990,872 which are incorporated herein by reference. The TYVEK is spun-bonded polyethylene. However, the packet can be of any suitable shape, and it can be of any suitable oxygen-permeable material, as discussed broadly above.

The weight of the formula which is used depends on the volume of the container from which oxygen is to be absorbed, and the permeable packet would be of a size to contain the desired amount of formula. A measured amount of water is injected into the packet by means of a needle to activate the formula, and the packet is thereafter inserted into the container in which oxygen is to be absorbed.

A formula which has been made includes by weight 100 mesh sponge grade iron, 31%, sodium chloride (325 mesh) 2%, 325 mesh sponge grade iron 31%, powdered cellulose (SOLKA-FLOC 200) 14%, potassium acid tartrate 11%, and silica gel 11%.

EXAMPLE I

A total of 4.93 grams of the above potassium acid tartrate composition was provided in a TYVEK packet having a dimension of 1.5 by 2 inches and it was injected with 1.5 grams of water and placed in a container having approximately 2% oxygen and 30% carbon dioxide with the remainder being nitrogen. A 3 inch by 3 inch blotter paper soaked with water was provided in the container in following a normal test procedure to provide moisture although it was not needed because the moisture for the oxygen-absorbing reaction was provided by the injection of water. The oxygen-absorption was effected at room temperature of about 72° F. Three tests were conducted as set forth in the following table, and the original oxygen present at each test, as measured by a Mocon tester, was as indicated in the table. The amount of oxygen-absorption in cc at the end of 2 hours, 4 hours, 6 hours and 24 hours is listed. The pH of the water-injected composition was 4.06.

Test Data for Example I

| | TEST 1 | TEST 2 | TEST 3 | AVERAGE |
|---|---|---|---|---|
| AMOUNTS OF $O_2$ ORIGINALLY PRESENT AND ABSORBED IN CC AFTER SPECIFIED TIMES | | | | |
| Original $O_2$ | 213 | 206 | 207 | 209 |
| 2 hours | 58 | 56 | 65 | 60 |
| 4 hours | 81 | 81 | 85 | 82 |
| 6 hours | 94 | 94 | 97 | 95 |
| 24 hours | 162 | 172 | 158 | 164 |
| AMOUNT OF $H_2$ PRESENT IN CC AFTER SPECIFIED TIME | | | | |
| 120 hours | 0 | 0 | 0 | 0 |

EXAMPLE II

In this example, sodium acid tartrate was substituted in the above formula for potassium acid tartrate, and the proportions of all the ingredients were the same. The tests were conducted at 41° F. The pH of the water-injected composition was 4.1.

Test Data for Example II

| | TEST 1 | TEST 2 | TEST 3 | AVERAGE |
|---|---|---|---|---|
| AMOUNTS OF $O_2$ ORIGINALLY PRESENT AND ABSORBED IN CC AFTER SPECIFIED TIMES | | | | |
| Original $O_2$ | 213 | 211 | 214 | 213 |
| 2 hours | 34 | 46 | 47 | 42 |
| 4 hours | 55 | 65 | 60 | 60 |
| 6 hours | 68 | 75 | 73 | 72 |
| 24 hours | 116 | 105 | 112 | 111 |
| 96 hours | 185 | 184 | 163 | 177 |
| AMOUNT OF $H_2$ PRESENT IN CC AFTER SPECIFIED TIME | | | | |
| 120 hours | 0 | 0 | 0 | 0 |

EXAMPLE III

A total of 4.93 grams of the following composition was provided in a TYVEK packet having a dimension of 1.5 by 2.0 inches. It contained by weight 31% of 100 mesh sponge grade iron, 31% of 325 mesh sponge grade iron, 1.6% sodium chloride, 11% potassium acid tartrate, 13.6% SOLKA-FLOC 200, and 11.6% silica gel. It was injected with 1.25 cc of water and tested in the same manner and under the same other conditions as EXAMPLE I except that the testing occurred at 40° F. The pH of the injected composition was 4.02.

Test Data for Example III

|  | TEST 1 | TEST 2 | TEST 3 | AVERAGE |
|---|---|---|---|---|
| AMOUNTS OF $O_2$ ORIGINALLY PRESENT AND ABSORBED IN CC AFTER SPECIFIED TIMES | | | | |
| Original $O_2$ | 202 | 203 | 211 | 205 |
| 2 hours | 29 | 24 | 32 | 28 |
| 4 hours | 46 | 41 | 51 | 46 |
| 6 hours | 57 | 53 | 65 | 58 |
| 24 hours | 102 | 96 | 111 | 103 |
| 48 hours | 145 | 132 | 160 | 146 |
| AMOUNT OF $H_2$ PRESENT IN CC AFTER SPECIFIED TIMES | | | | |
| 8 days | 0 | 0 | 0 | 0 |
| 20 days | 0 | 0 | 0 | 0 |
| 30 days | 0 | 0 | 0 | 0 |

EXAMPLE IV

A total of 4.85 grams of the following composition was provided in a TYVEK packet having a dimension of 1.5 by 2.0 inches. It contained by weight 37% of 100 mesh sponge grade iron, 37% of 325 mesh sponge grade iron, 13.4% potassium acid tartrate, 13.6% SOLKA-FLOC 200, and 11.6% silica gel. There was no sodium chloride in the composition. It was injected with 1.25 cc of water and tested in the same manner as EXAMPLE I. The oxygen absorption was effected at 41° F. The pH of the injected composition was 4.21.

Test Data for Example IV

|  | TEST 1 | TEST 2 | TEST 3 | AVERAGE |
|---|---|---|---|---|
| AMOUNTS OF $O_2$ ORIGINALLY PRESENT AND ABSORBED IN CC AFTER SPECIFIED TIMES | | | | |
| Original $O_2$ | 213 | 213 | 218 | 215 |
| 2 hours | 28 | 28 | 35 | 30 |
| 4 hours | 54 | 50 | 54 | 53 |
| 7 hours | 68 | 71 | 74 | 71 |
| 24 hours | 85 | 114 | 108 | 102 |
| 48 hours | 132 | 141 | 131 | 135 |
| AMOUNT OF $H_2$ PRESENT IN CC AFTER SPECIFIED TIME | | | | |
| 48 hours | 0 | 0 | 0 | 0 |

EXAMPLE V

The weight and percentages of components were the same as for EXAMPLE IV. All test conditions were the same as for EXAMPLE IV. However, the pH of the injected composition was 3.90.

Test Data for Example V

|  | TEST 1 | TEST 2 | TEST 3 | AVERAGE |
|---|---|---|---|---|
| AMOUNTS OF $O_2$ ORIGINALLY PRESENT AND ABSORBED IN CC AFTER SPECIFIED TIMES | | | | |
| Original $O_2$ | 225 | 212 | 221 | 219 |
| 2 hours | 20 | 30 | 32 | 27 |
| 4 hours | 45 | 51 | 55 | 50 |
| 7 hours | 60 | 69 | 84 | 71 |
| 24 hours | 98 | 113 | 127 | 113 |
| 48 hours | 125 | 140 | 151 | 139 |
| AMOUNT OF $H_2$ PRESENT IN CC AFTER SPECIFIED TIME | | | | |
| 48 hours | 0 | 0 | 0 | 0 |

EXAMPLE VI

A total of 4.93 grams of the following composition was provided in a TYVEK packet having a dimension of 1.5 by 2.0 inches. It contained by weight 31% of 100 mesh sponge grade iron, 31% of 325 mesh sponge grade iron, 11.2% potassium sodium tartrate tetrahydrate, 13.6% SOLKA-FLOC 200, 11.6% silica gel, and 6% sodium chloride. It was injected with 1.5 cc of water and tested in the same manner as EXAMPLE I. The oxygen absorption was effected at 40° F. The pH of the injected composition was 6.97.

Test Data for Example VI

|  | TEST 1 | TEST 2 | TEST 3 | AVERAGE |
|---|---|---|---|---|
| AMOUNTS OF $O_2$ ORIGINALLY PRESENT AND ABSORBED IN CC AFTER SPECIFIED TIMES | | | | |
| Original $O_2$ | 210 | 211 | 212 | 211 |
| 2 hours | 25 | 24 | 23 | 24 |
| 4 hours | 42 | 39 | 34 | 38 |
| 6 hours | 51 | 48 | 45 | 48 |
| 24 hours | 89 | 79 | 91 | 86 |
| 96 hours | 152 | 120 | 139 | 137 |
| AMOUNT OF $H_2$ PRESENT IN CC AFTER SPECIFIED TIME | | | | |
| 96 hours | 0 | 0 | 0 | 0 |

EXAMPLE VII

A total of 4.93 grams of the following composition was provided in a TYVEK packet having a dimension of 1.5 by 2.0 inches. It contained by weight 31.0% of 100 mesh sponge grade iron, 31.0% of 325 mesh sponge grade iron, 11.2% sodium tartrate dihydrate, 13.6% SOLKA-FLOC 200, 11.6% silica gel and 1.6% sodium chloride. It was injected with 1.5 cc of water and tested in the same manner as EXAMPLE I.

The oxygen absorption was effected at 40° F. The pH of the injected composition was 6.55.

Test Data for Example VII

|  | TEST 1 | TEST 2 | TEST 3 | AVERAGE |
|---|---|---|---|---|
| AMOUNTS OF $O_2$ ORIGINALLY PRESENT AND ABSORBED IN CC AFTER SPECIFIED TIMES | | | | |
| Original $O_2$ | 212 | 212 | 226 | 217 |
| 2 hours | 25 | 26 | 30 | 27 |
| 4 hours | 37 | 91 | 53 | 44 |
| 6 hours | 46 | 54 | 65 | 55 |
| 24 hours | 92 | 96 | 106 | 98 |
| 96 hours | 144 | 143 | 142 | 143 |
| AMOUNT OF $H_2$ PRESENT IN CC AFTER SPECIFIED TIME | | | | |
| 96 hours | 0 | 0 | 0 | 0 |

COMPARATIVE EXAMPLE VIII

A total of 4.93 grams of the following composition was provided in a TYVEK packet having a dimension of 1.5 by 2.0 inches. It contained by weight 26.8% of 100 mesh sponge grade iron, 26.8% of 325 mesh sodium chloride, 1.4% 325 mesh sponge grade iron, 12% SOLKA-FLOC 200, and 16.8% dry malic acid, 6% sodium bicarbonate and 10% silica gel. It was injected with 1.0 cc of 5% acetic acid and tested in the same manner and under the same conditions as EXAMPLE I except that the testing occurred at 40° F. The pH of the injected composition was 3.76.

Test Data for Example VIII

|  | TEST 1 | TEST 2 | TEST 3 | AVERAGE |
|---|---|---|---|---|
| AMOUNTS OF $O_2$ ORIGINALLY PRESENT AND ABSORBED IN CC AFTER SPECIFIED TIMES | | | | |
| Original $O_2$ | 200 | 198 | 199 | 199 |
| 2 hours | 28 | 30 | 20 | 26 |
| 4 hours | 47 | 56 | 43 | 49 |
| 6 hours | 68 | 71 | 58 | 66 |
| 24 hours | 120 | 114 | 110 | 115 |
| 48 hours | 142 | 153 | 151 | 149 |
| 120 hours | 175 | 198 | 180 | 184 |
| AMOUNT OF $H_2$ PRESENT IN CC AFTER SPECIFIED TIME | | | | |
| 5 days | 50 | 50 | 40 | 48 |

COMPARATIVE EXAMPLE IX

The following composition was treated. A total of 4.93 grams of the composition was provided in a TYVEK packet. It contained by weight 10% silica gel, 26.8% of 100 mesh sponge grade iron, 1.4% of 325 mesh sodium chloride, 26.8% of 325 sponge grade mesh iron, 12% SOLKA-FLOC 200, 16.8% dry malic acid, and 6.1% sodium bicarbonate. It was injected with 1.0 cc of 5% acetic acid. The pH was 3.38. The testing occurred at 40° F.

Test Data for Example IX

|  | TEST 1 | TEST 2 | TEST 3 | AVERAGE |
|---|---|---|---|---|
| AMOUNTS OF $O_2$ ORIGINALLY PRESENT AND ABSORBED IN CC AFTER SPECIFIED TIMES | | | | |
| Original $O_2$ | 220 | 220 | 217 | 219 |
| 2 hours | 19 | 19 | 30 | 23 |
| 4 hours | 49 | 44 | 59 | 51 |
| 24 hours | 89 | 75 | 108 | 92 |
| AMOUNT OF $H_2$ PRESENT IN CC AFTER SPECIFIED TIME | | | | |
| 24 hours | 30 | 30 | 40 | 33 |

It can thus be seen that EXAMPLES VIII and IX which contained an acid did generate hydrogen whereas all of the examples which contained a tartrate did not generate hydrogen.

While the above examples disclosed various forms of sodium and potassium tartrates, it is believed that other soluble tartrates including but not limited to dipotassium tartrate; ammonium tartrate, dibasic; calcium tartrate dihydrate; diethyl tartrate; and diisopropyl tartrate may also function to absorb oxygen without producing hydrogen.

In all of the above reactions the oxygen is absorbed by forming an oxide on the iron, as is well known.

While the above subject matter referred to injecting the compositions with water to activate them, it will be appreciated that water-injection need not be effected if the composition is placed in a high moisture environment which will provide the moisture for activation.

While preferred embodiments of the present invention have been disclosed, it will be appreciated that it is not limited thereto but may be otherwise embodied within the scope of the following claims.

The invention claimed is:

1. A method of absorbing oxygen from a closed environment comprising the steps of providing an oxygen-absorbing composition consisting essentially of iron and a tartrate, and injecting water into said composition.

2. A method of absorbing oxygen as set forth in claim 1 wherein said iron is present by weight in an amount of between 55% and 98%, and wherein said tartrate is present by weight in an amount of between about 3% and 50%.

3. A method of absorbing oxygen as set forth in claim 1 wherein said iron is present by weight in an amount of between about 70% and 95%, and wherein said tartrate is present by weight in an amount of between about 5% and 35%.

4. A method of absorbing oxygen as set forth in claim 1 wherein said iron is present by weight in an amount of between about 80% and 90%, and where in said tartrate is present by weight in an amount of between about 10% and 20%.

5. A method of absorbing oxygen as set forth in claim 1 where in said tartrate is selected from the group consisting of potassium acid tartrate, sodium acid tartrate, potassium sodium tartrate tetrahydrate, and sodium tartrate dihydrate.

6. A method of absorbing oxygen as set forth in claim 1 wherein said tartrate is selected from the group consisting of dipotassium tartrate; ammonium tartrate, dibasic; calcium tartrate dihydrate; diethyl tartrate; and diisopropyl tartrate.

7. A method of absorbing oxygen as set forth in claim 1 wherein said composition includes a water-absorbing agent.

8. A method of absorbing oxygen as set forth in claim 7 wherein said iron is present by weight in an amount of between 55% and 98%, and wherein said tartrate is present by weight in an amount of between about 3% and 50% and wherein said water-absorbing agent is present by weight in an amount of between about 1% and 50%.

9. A method of absorbing oxygen as set forth in claim 7 wherein said iron is present by weight in an amount of between about 70% and 95%, and wherein said tartrate is present by weight in an amount of between about 5% and 35% and wherein said water-absorbing agent is present by weight in an amount of between 3% and 30%.

10. A method of absorbing oxygen as set forth in claim 7 wherein said iron is present by weight in an amount of between about 80% and 90%, and wherein said tartrate is present by weight in an amount of between about 10% and 20% and wherein said water-absorbing agent is present by weight in an amount of between 5% and 15%.

11. A method of absorbing oxygen as set forth in claim 7 where in said tartrate is selected from the group consisting of potassium acid tartrate, sodium acid tartrate, potassium sodium tartrate tetrahydrate, and sodium tartrate dihydrate.

12. A method of absorbing oxygen as set forth in claim 7 wherein said tartrate is selected from the group consisting of dipotassium tartrate; ammonium tartrate, dibasic; calcium tartrate dihydrate; diethyl tartrate; and diisopropyl tartrate.

13. A method of absorbing oxygen from a closed environment comprising the steps of providing an oxygen-absorbing composition comprising iron and a tartrate, and injecting water into said composition wherein said tartrate is selected from the group consisting of potassium acid tartrate, sodium acid tartrate, potassium sodium tartrate tetrahydrate, sodium tartrate dihydrate, dipotassium tartrate; ammonium tartrate, dibasic; calcium tartrate dihydrate; diethyl tartrate; and diisopropyl tartrate.

14. A method of absorbing oxygen as set forth in claim 13 wherein said oxygen-absorbing composition includes a water-absorbing agent.

15. A method of absorbing oxygen from a closed environment compising the steps of providing an oxygen-absorbing composition consisting essentially of iron, a tartrate selected from the group consisting of potassium acid tartrate, sodium acid tartrate, potassium sodium tartrate tetrahydrate, sodium tartrate dihydrate, dipotassium tartrate; ammonium tartrate, dibasic; calcium tartrate dihydrate; diethyl tartrate; and diisopropyl tartrate; and an electrolyte, and injecting water into said composition.

16. A method of absorbing oxygen as set forth in claim 15 wherein said composition includes a water-absorbing agent.

17. A method of absorbing oxygen from a closed environment comprising the steps of providing an oxygen-absorbing composition comprising iron, a, tartrate selected from the group consisting of potassium acid tartrate, sodium acid tartrate, potassium sodium tartrate tetrahydrate, sodium tartrate dihydrate, dipotassium tartrate; ammonium tartrate, dibasic; calcium tartrate dihydrate; diethyl tartrate; and diisopropyl tartrate; and an electrolyte, and injecting water into said composition.

18. A method of absorbing oxygen as set forth in claim 17 wherein said oxygen-absorbing composition includes a water-absorbing agent.

\* \* \* \* \*